United States Patent [19]
Schmitt et al.

[11] Patent Number: 5,544,949
[45] Date of Patent: Aug. 13, 1996

[54] TRACTION CONTROL SYSTEM

[75] Inventors: Johannes Schmitt, Markgroeningen, Germany; Andreas Burg, Clayton, Australia; Ralf Donath, Ditzingen, Germany

[73] Assignee: Robert Bosch GmbH, Stuttgart, Germany

[21] Appl. No.: 531,211

[22] Filed: Sep. 19, 1995

[30] Foreign Application Priority Data

Sep. 20, 1994 [DE] Germany ............... 44 33 459.1

[51] Int. Cl.$^6$ .............. B60T 8/32; B60K 23/04; B60K 28/16
[52] U.S. Cl. .............. 303/140; 303/147; 180/197
[58] Field of Search .............. 303/140, 146, 303/147, 141, 148, 139, 156, 199, 163, 169, 191; 180/197, 248–250, 233; 364/426.01, 426.02, 426.03; 188/181 C, 181 A

[56] References Cited

U.S. PATENT DOCUMENTS

| | | | |
|---|---|---|---|
| 5,172,318 | 12/1992 | Meissner | 180/197 |
| 5,193,889 | 3/1993 | Schaefer et al. | 303/100 |
| 5,419,622 | 5/1995 | Burg et al. | 303/100 |

*Primary Examiner*—Douglas C. Butler
*Attorney, Agent, or Firm*—Felfe & Lynch

[57] ABSTRACT

When a first drive wheel is braked as a function of slippage at that wheel, braking intervention at the second drive wheel is precluded until the braking intervention at the first drive wheel is essentially terminated. This produces a locking differential effect.

19 Claims, 7 Drawing Sheets

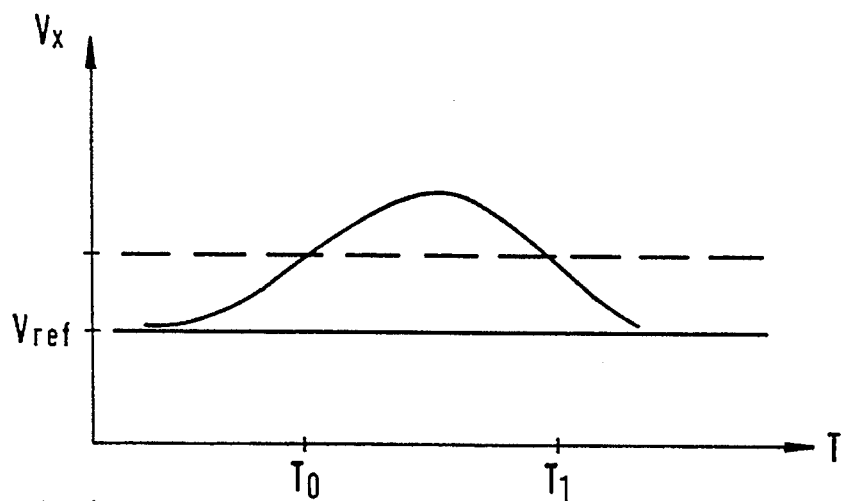
FIG. 2a
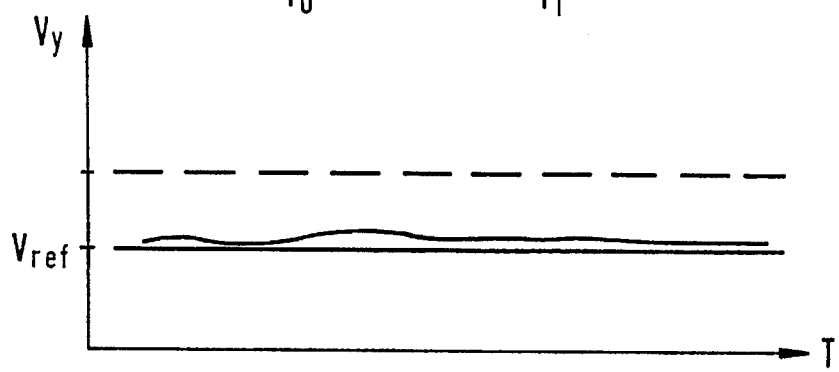
FIG. 2b
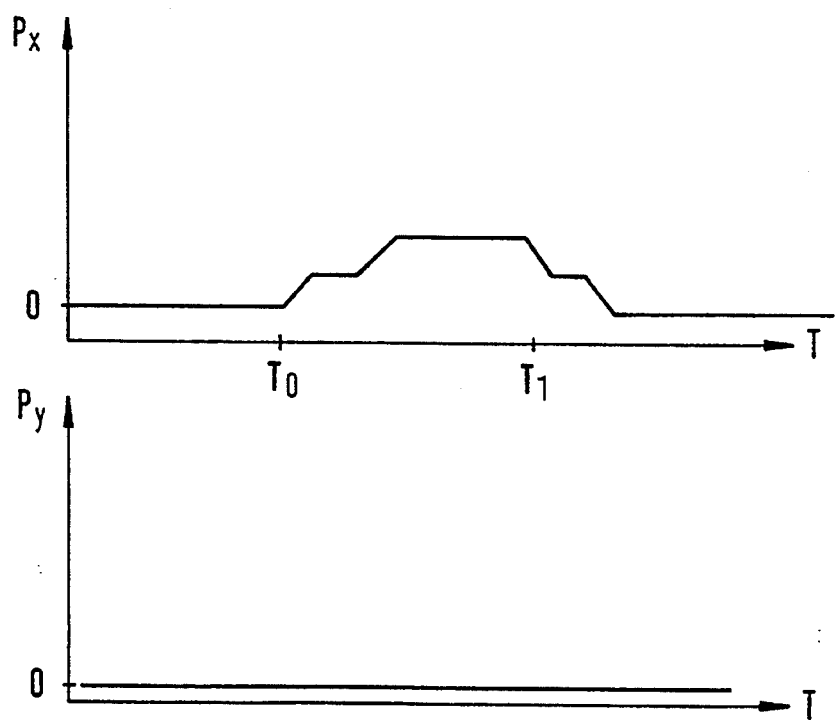
FIG. 2c
FIG. 2d

TRACTION CONTROL SYSTEM

PRIOR ART

The invention relates to a traction control system, preferably for improving the traction and for producing a locking differential effect by braking intervention of the driving wheels of a vehicle.

A traction control system of this kind is known from the German Offenlegungsschrift 39 16 046 (U.S. Pat. No. 5,193, 889). The traction control system described there intervenes in the brake of at least one driving wheel in order to reduce excessive slip at the respective driving wheel. Wheel vibrations may occur as a result of such braking intervention or as a result of external influences such as sections of road with poor quality surfaces. In order to avoid undesired effects of this kind there is provision in the known traction control system for wheel vibrations to be detected and countermeasures for reducing or limiting these wheel vibrations to be initiated. In such cases, the detection of the vibrations is particularly complex and problematic technically.

Therefore, the object of the invention is to disclose a traction control system, preferably for improving the traction and for producing a locking differential effect, in which traction control system complex measures for detecting and limiting vibrations can be dispensed with and yet vibrations are avoided.

The German Offenlegungsschrift 41 23 783 discloses a traction control system in which the build-up of pressure or the reduction in pressure at the individual wheel brakes is brought about by a series of pulses, the same change in pressure being brought about at each pulse and a measure of the pressure at the wheel brake being estimated from the difference between the pressure build-up and pressure reduction pulses.

SUMMARY OF THE INVENTION

The procedure according to the invention effectively prevents wheel vibrations in a traction control system, preferably for improving the traction and for producing a locking differential effect in a vehicle.

As a result, complex vibration detection and limiting measures can be advantageously dispensed with. In particular, measures for detecting vibrations can be advantageously dispensed with.

Preferably the traction control system is carried out by braking intervention of the brakes of the driving wheels.

A particularly advantageous application of the procedure according to the invention is to realize an electric locking differential effect within the scope of a traction control system, which locking differential effect remains active when the actual traction controller is switched off.

Further advantages of the invention emerge from the following description of exemplary embodiments and from the dependent claims.

BRIEF DESCRIPTION OF THE DRAWINGS

FIGS. 2a, 2b, 2c and 2d, illustrate the control procedure when a drive wheel on one side has excessive slip;

Figure 5:
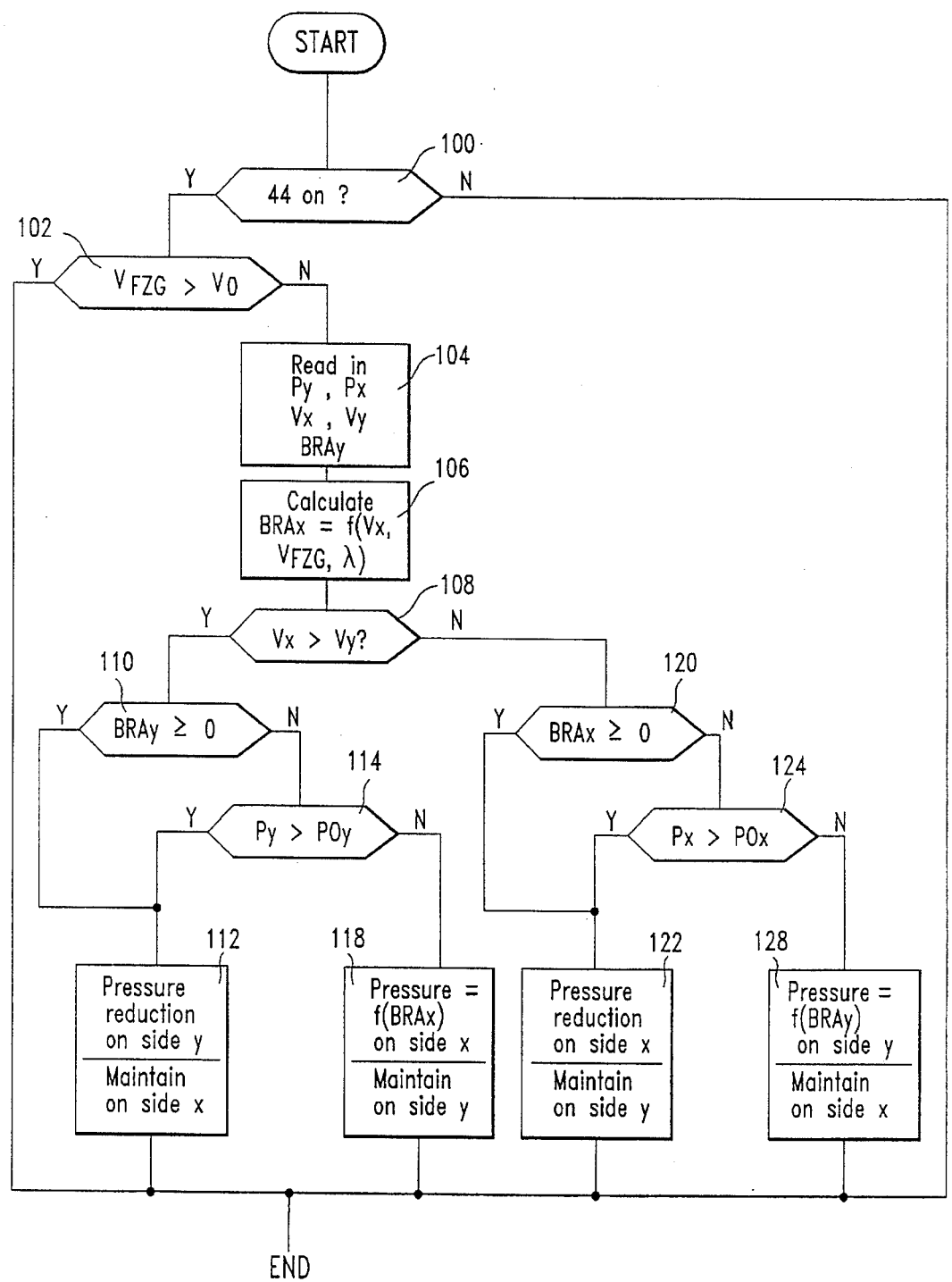
Figure 6A:
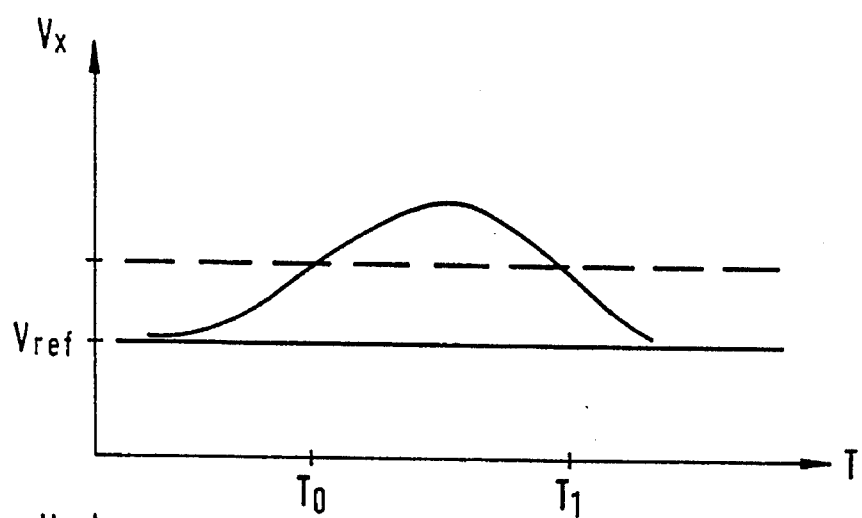
Figure 6B:
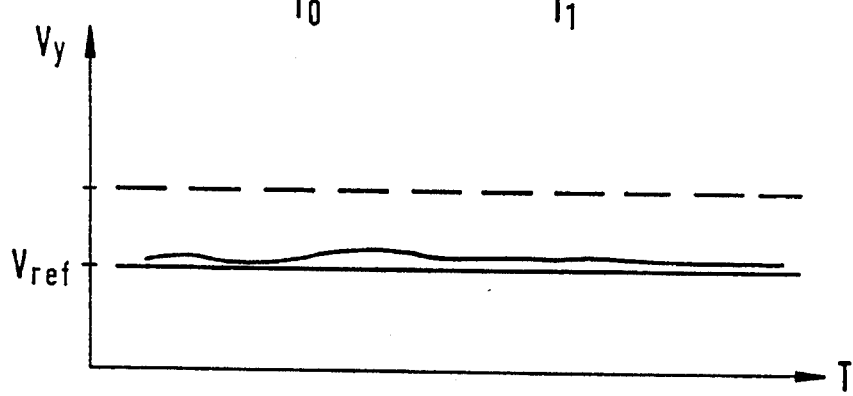
Figure 6C:
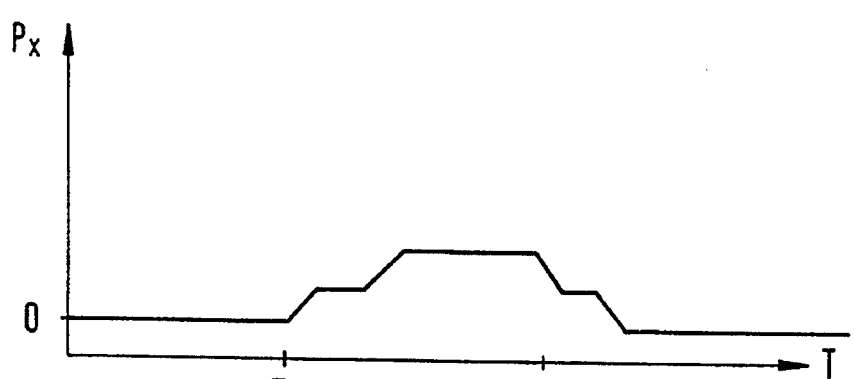
Figure 6D:
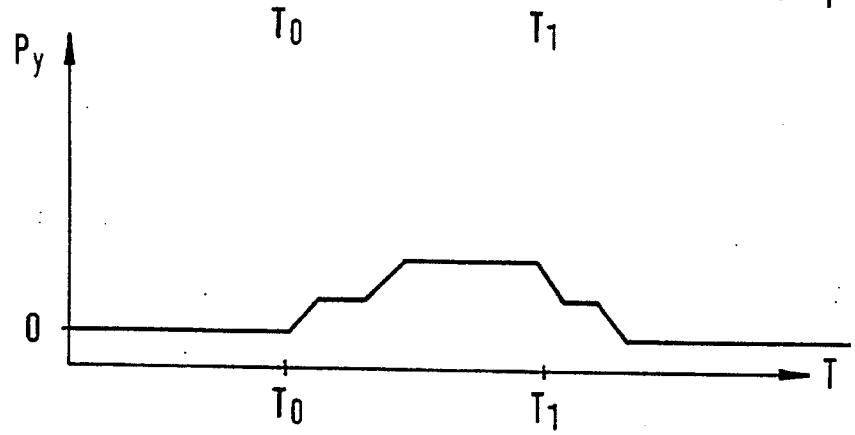
Figure 7:
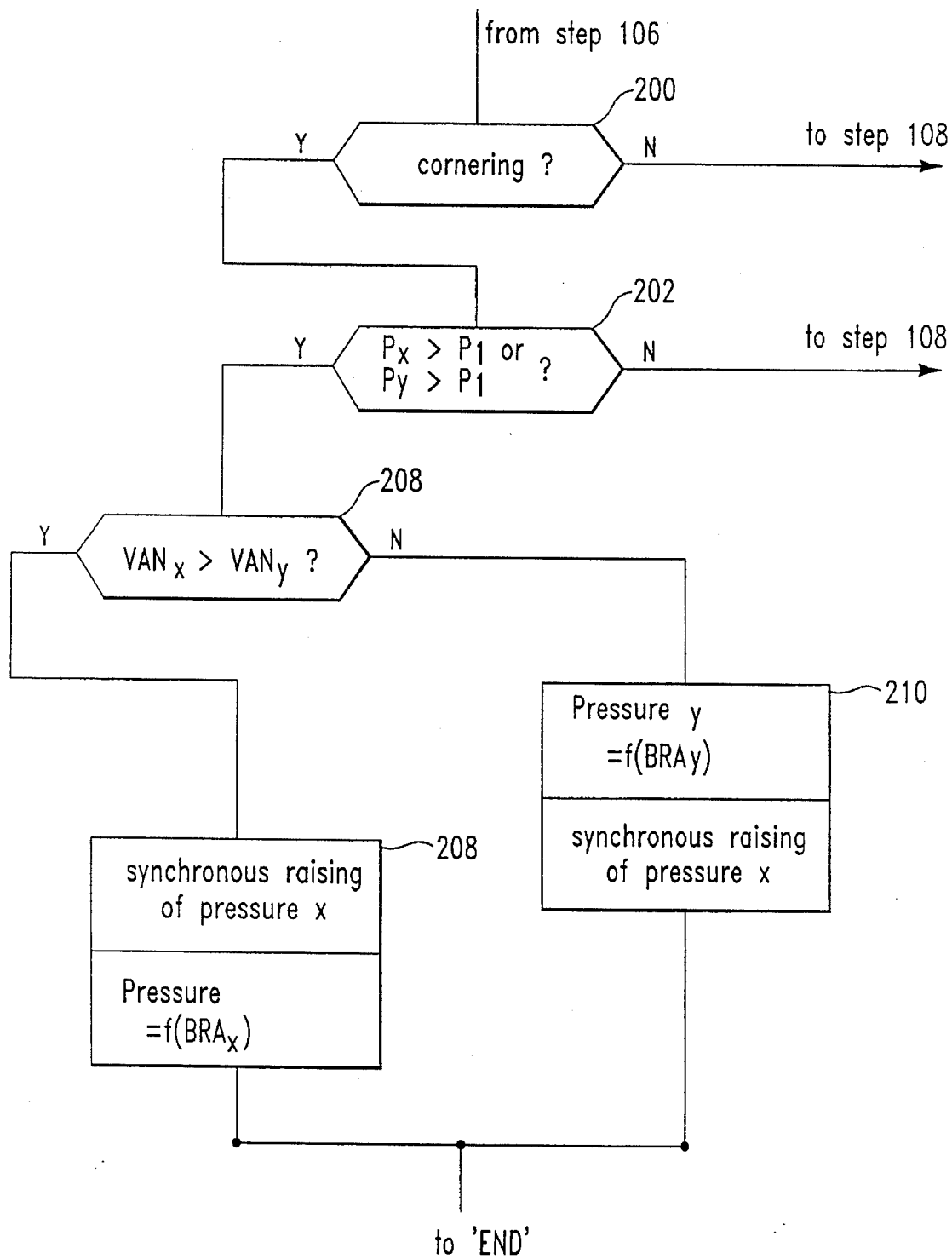

FIGS, 4a, 4b, 4c and 4d illustrates the control procedure when the wheels slip simultaneously;

FIG. 5 is a flow digram illustrating the logic steps for realizing the control procedure;

FIG. 6a, 6b, 6c and 6d illustrate the control procedure when the vehicle is cornering; and FIG. 7 is a supplementary flow diagram illustrating the logic when the vehicle is cornering.

DESCRIPTION OF EXEMPLARY EMBODIMENTS

Figure 1:
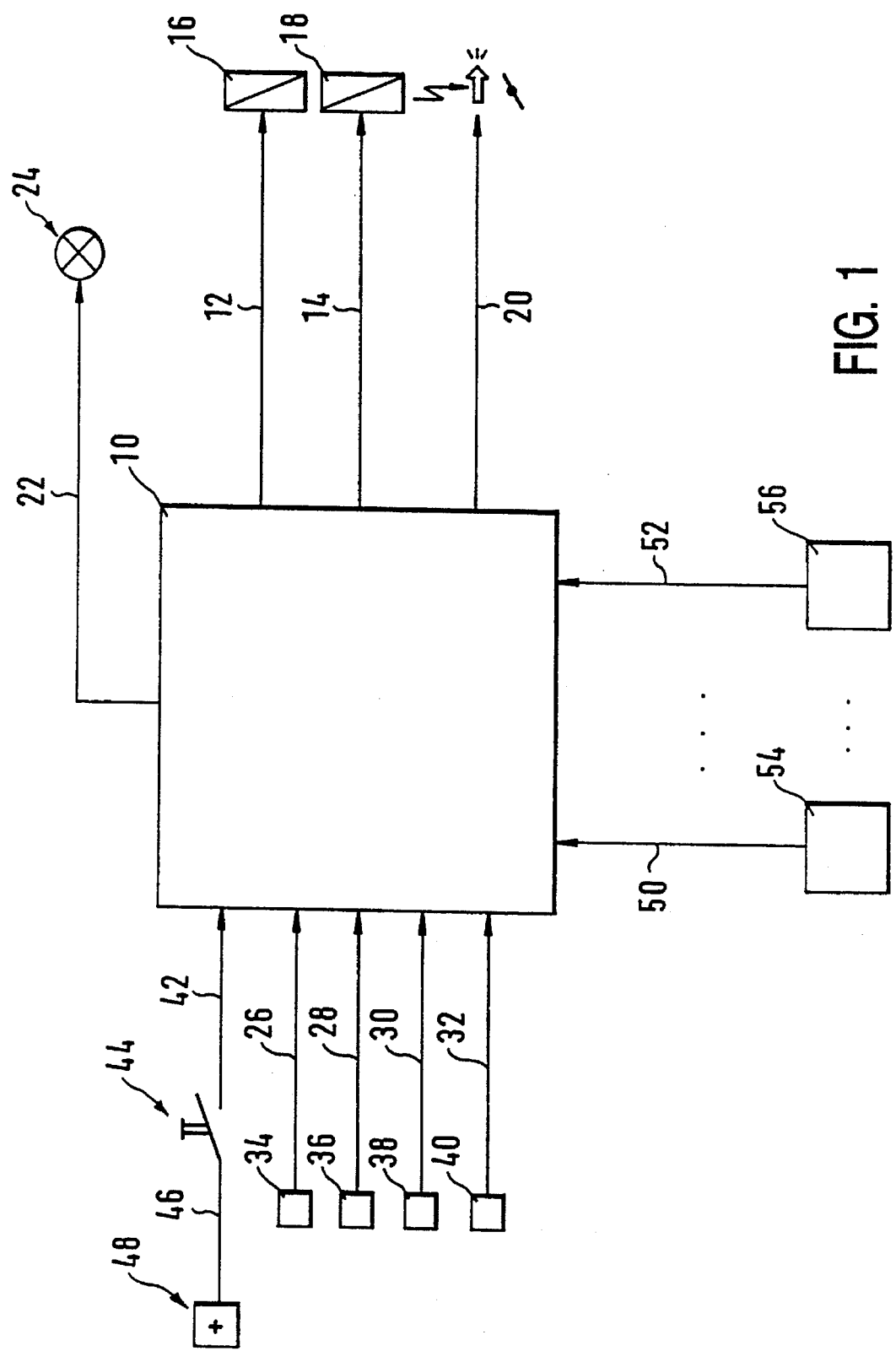
FIG. 1 is a block circuit diagram of a traction control system.
Figure 3A:
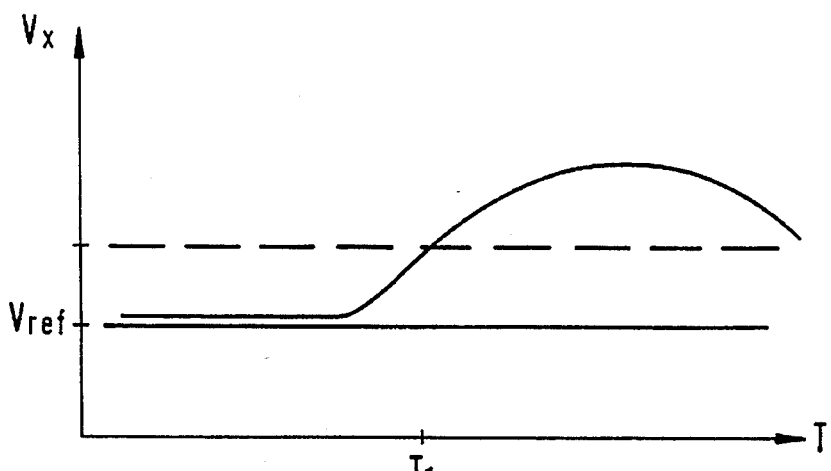
FIGS. 3a, 3b, 3c and 3d illustrate the control procedure when drive wheels successively experience excessive slip.
Figure 3B:
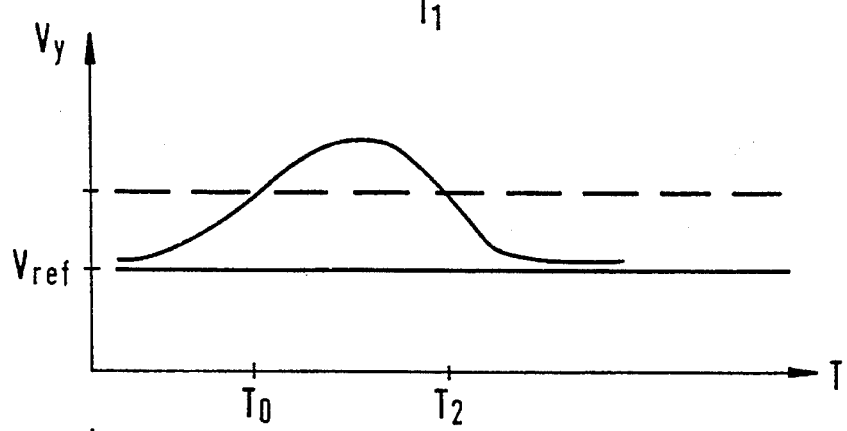
Figure 3C:
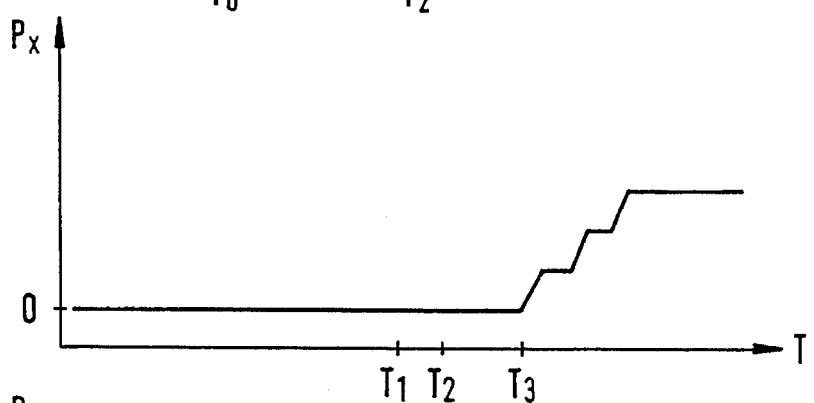
Figure 3D:
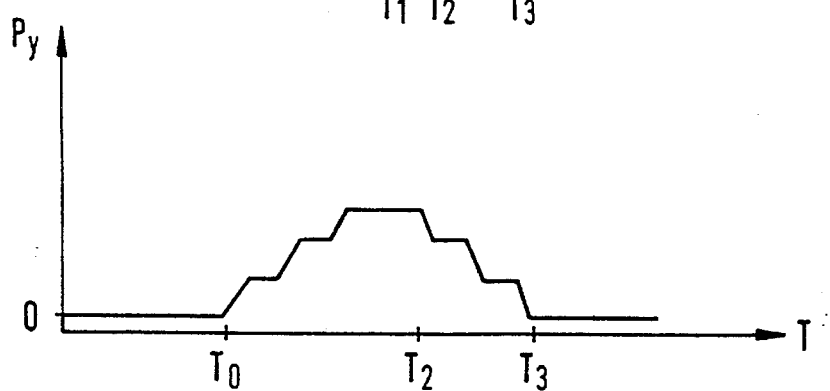
Figure 4A:
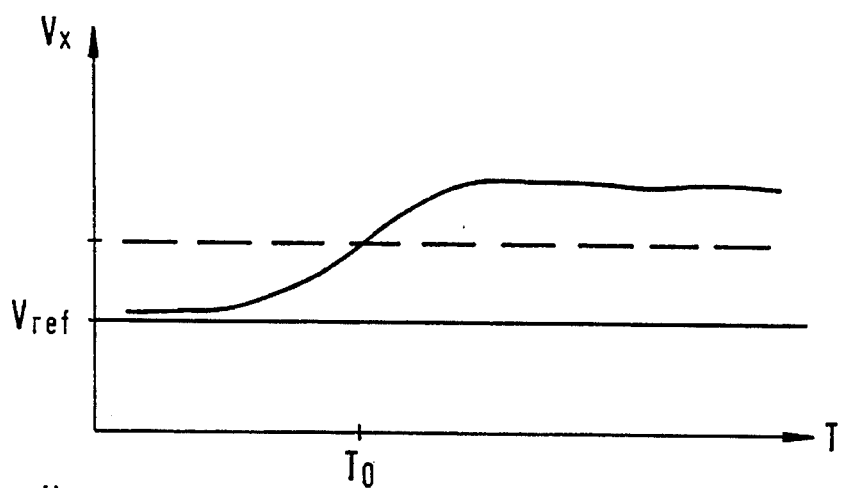
Figure 4B:
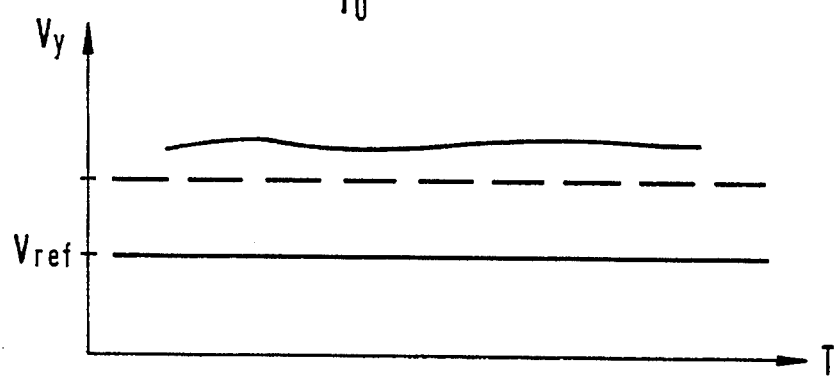
Figure 4C:
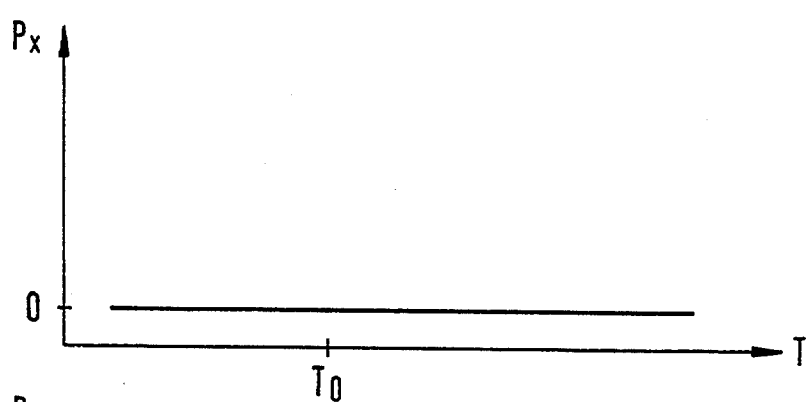
Figure 4D:
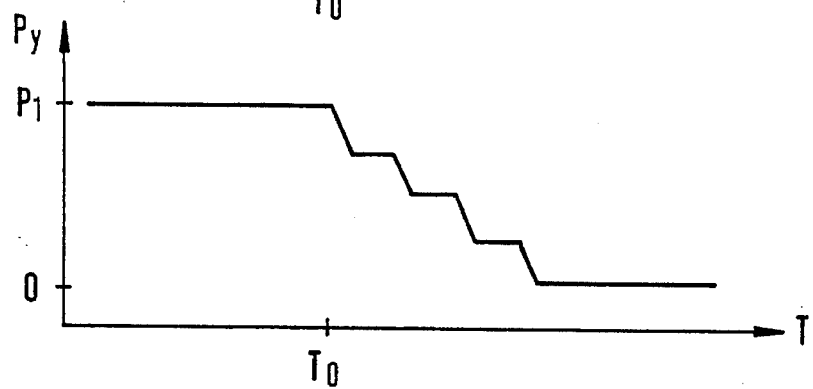

FIG. 1 shows a control unit 10 which actuates solenoid valves 16 and 18 via the output lines 12 and 14 in order to control the brakes of at least two driving wheels. Via the output line 20, the control unit 10 influences the power of the drive unit of the vehicle by metering fuel, setting the ignition time and/or supplying air. In addition, the control unit 10 has an output line 22 with which it actuates an information lamp or warning lamp 24. Input lines 26, 28, 30 and 32 connect the control unit 10 wheel speed sensors 34, 36, 38 and 40 and an input line 42 is provided which connects the control unit 10 to a switch 44 which can be activated by the driver and which is connected to a voltage source 48 via the line 46. In addition, input lines 50 to 52 are provided which connect the control unit 10 to measuring devices 54 to 56 in order to detect further operating variables of the drive unit and/or of the vehicle.

In the preferred exemplary embodiment, the control unit 10 comprises a traction controller which controls the slip at the driving wheels by influencing the wheel brakes and the driving torque of the vehicle in terms of stabilizing the vehicle and improving the traction to prescribed values. This traction controller can be switched off by the driver in the preferred exemplary embodiment by activating the switch 44. When the traction controller is switched off, in order to improve the traction a locking differential effect is maintained, i.e. a control of the locking torque of the differential of the vehicle is maintained. Despite the fact that the traction controller is switched off, traction monitoring can thus be continued. The basic principle in the control of the locking torque by intervening in the wheel brakes is that the build-up of brake pressure at the wheel which becomes unstable later is not permitted until the brake pressure in the brake of the first wheel to become unstable has dropped below a prescribed minimum pressure. In this case, the pressure-metering brake torque control which is known from the DE 41 23 783 is advantageously used to actuate the wheel brake valves. The function of controlling the locking torque is explained in greater detail with reference to exemplary driving situations by means of the time diagrams in FIGS. 2 to 4.

The driving situation in which the driving wheel on one side (side x) has an excessive slip is illustrated in FIG. 2. Here, FIG. 2a shows the variation over time of the wheel speed $v_x$ at the driving wheel on side x, 2b shows the variation over time of the wheel speed $v_y$ on the other side, the y side, FIG. 2c shows the brake pressure $P_x$ applied to the wheel brake of the driving wheel on the side x, FIG. 2d shows the brake pressure Py applied to the wheel brake of the driving wheel on the other side. The reference speed VREF which corresponds essentially to the speed of the vehicle is entered in FIGS. 2a and 2b. Said reference speed VREF will be assumed to be constant in the present driving situation. In addition, the permitted deviation of the wheel speed from the reference speed is entered using broken lines. This represents the desired value for the braking intervention, the brake torque control known from the prior art. The tendency to spin of a wheel is calculated here in the preferred exemplary embodiment by comparing the wheel speed with the speed of the vehicle taking into account the desired value slip lambda. It will be assumed that the wheel speed Vx of the driving wheel on the x side exceeds the desired value for the braking intervention at the time $t_0$. The tendency of the driving wheel to spin is thus detected and the brake pressure control is initiated starting from the time $t_0$ in accordance with FIG. 2c. It will be assumed that the speed Vx drops below the desired value at the time $t_1$ so that the brake can be released starting from the time $t_1$, i.e. the pressure Px is reduced in accordance with FIG. 2c. It will be assumed that no tendency to spin occurs at the driving wheel on the y side during this time, which is symbolized in FIG. 2b by the fact that the wheel speed $v_y$ remains underneath the threshold illustrated by broken lines, essentially equal to the reference speed. Therefore, it will be assumed that the brake pressure Py at this wheel brake remains at zero during this time. The corresponding procedure is adopted when a tendency to spin occurs at the driving wheel on the y side.

In FIG. 3, a driving situation is illustrated in which the two driving wheels successively experience a tendency to spin. It will be assumed that the wheel speed Vy exceeds the desired value at the time $t_0$. This leads to a build-up in pressure in the associated wheel brake cylinder, which is illustrated by the step-shaped profile of the brake pressure Py according to FIG. 3d. It will be assumed that the wheel speed Vx exceeds the threshold value at the time $t_1$ during the brake torque control on the y side, i.e. it will be assumed that a tendency to spin also occurs at the driving wheel on the x side (cf. FIG. 3a). According to the invention, there is no build-up of pressure in the wheel brake on the x side starting from the time $t_1$. Instead, a pressure is not built up on the x side until the time $t_3$, at which time the brake pressure Py has dropped to a prescribed value, here zero. The brake pressure Py is reduced incrementally at the time $t_2$ after the wheel speed Vy has dropped below the desired value within the scope of the brake torque control. At the time $t_3$ it has reached the value zero, which according to the example illustrated with the continued presence of a tendency to spin on the x side leads to a build-up of pressure. Thus, the build-up of brake pressure at the wheel which becomes unstable later is not allowed until the brake pressure at the first wheel which was the first to become unstable has dropped below an adjustable minimum pressure.

Corresponding measures are taken if first the wheel speed Vx, and then the wheel speed Vy, exceed the desired value.

Finally, in FIG. 4 the driving situation is illustrated when both driving wheels spin simultaneously. In such a case it is assumed by way of example that the wheel speed Vy is constantly above the desired value during the time period under consideration (cf. FIG. 4b). The brake pressure in the associated wheel brake will be assumed to be at a value in this operation situation without a reduction in the wheel speed Vy resulting. It will be assumed that a tendency to spin also occurs at the driving wheel on the x side at the time $t_0$. It will be assumed that the wheel speed Vx exceeds the desired value. According to the invention, this leads to an incremental reduction in the brake pressure on the y side to the value zero starting from the time $t_0$. A build-up of brake pressure in the brake on the x side is not effected (cf. FIGS. 4c and 4d). The reduction in the wheel speeds will then be carried out by the driver correspondingly decreasing the driving power, and the procedure described in FIGS. 2 and 3, if appropriate FIG. 4, will be initiated again.

In the opposite case, given the presence of a tendency to spin on the x side and then the occurrence of a tendency to spin on the y side, pressure on the x side is reduced and a build-up on the y side is not effected.

In the preferred exemplary embodiment the procedure described is carried out with the traction controller switched off, i.e. the switch 44 activated and the traction monitoring in operation.

In conclusion, it is to be noted that a control intervention in order to control the traction on one side while maintaining the brake pressure on the other side (preferably to the value zero) takes place if the wheel speed on one side is higher than on the other side, there is no tendency to spin detected on the other side and there is no build-up of brake pressure. A reduction in the brake pressure on one side takes place while maintaining the zero brake pressure on the other side if the wheel speed on the other side is higher than that on the first side, there is no tendency to spin on the first side any longer and brake pressure is being built up there. In addition, a reduction in pressure takes place on one side of the vehicle if the wheel speed on this side is higher than on the other side of the vehicle and a tendency to spin of the wheels occurs on both sides of the vehicle.

When the switch 44 is set, the brake torque control is therefore only used to produce a locking torque. In such a case, only one wheel is ever braked by the braking intervention. If there is a tendency to spin on both sides, the pressure is reduced and locking torque is not realized any longer.

It is furthermore provided that the procedure described for producing a locking torque operates only below a speed threshold, for example 80 km/h. Locking torque is not realized any longer above this threshold. The speed of the vehicle at the beginning of the intervention is decisive in this case.

In the preferred exemplary application the described procedure serves to produce a locking differential effect with the traction controller switched off. Usually, a control of the driving torque is provided within the scope of the actual traction controller, during which control of the driving torque an intervention is made in the torque output by the drive unit in order to control the slip at the wheels of the vehicle for the purpose of improving stability and traction. This intervention in the driving torque of the drive unit, with the switch 44 closed and the locking differential active, is used only to protect the brake against over-heating. At the same time there is provision for the desired value which serves to intervene in the control of the driving torque to be influenced, preferably being increased to very high values as long as the pressure in the brake cylinders drops below a predetermined limit value. If the pressure in the brake cylinders of the driving wheels exceeds this prescribed limit value so that there is a risk of the brakes overheating, in a preferred exemplary embodiment the intervention in the engine torque is permitted even when a locking torque is being produced. In addition, in one advantageous exemplary embodiment a model for determining the temperature of the brake from the pressure and speed of revolution may be provided. If this estimated brake temperature exceeds a prescribed limit value, the desired value for the engine torque control is reduced so that when there is a tendency to spin of a wheel an intervention in the engine torque, in conjunction with the production of a locking torque, is also made possible.

Particular attention must be paid to cornering on a carriageway with a high coefficient of friction. In this case, the desired value for the braking intervention is reduced (values entered using broken lines in FIGS. 2 to 4) in order to be able to prevent as far as possible intervention in the brake torque control. In this case, in fact the situation illustrated in FIG. 4 occurs, in which situation both driving wheels are detected as spinning as a result of the reduced slip threshold value and thus braking intervention which has an additional adverse effect on cornering does not take place.

In another exemplary embodiment, there is provision that when cornering is detected (by means of a steering angle sensor or by comparison of the speeds of revolution of the nondriven wheels on different sides of the vehicle) and a driving wheel has been detected to be unstable, the build-up of pressure takes place there. If the pressure reaches a prescribed threshold value, pressure is built up synchronously at both driving wheels independently of the state even at the other driving wheel. As a result, during cornering an excessively large locking effect is prevented and the stability of the vehicle is increased.

In addition, a timing element which introduces a delay time for the next build-up of pressure after a tendency to spin has been detected at both wheels is advantageously provided in conjunction with the operating situation according to FIG. 4.

In addition, measures are advantageously provided which lead to the locking torque being limited. The maximum possible brake pressure to be applied is prescribed for this purpose as a function of the control deviation between the wheel speed and the desired value, as well as the speed of the vehicle, the said desired value dropping significantly as the travelling speed increases so that it reaches the value zero at the limit speed of for example 80 km/h. In addition, there is provision to permit a larger pressure as the control deviation becomes larger until the maximum pressure possible for the current speed of the vehicle is reached.

In addition, the information lamp illustrated in FIG. 1 is provided in order to provide the driver with information. This information lamp lights up when the switch 44 is switched on and thus conveys to the driver the information that the actual traction controller is switched off and only the differential effect or traction monitoring is available. If one or more unstable driving wheels are detected (slip threshold has been exceeded), the information lamp flashes in order to indicate the critical driving situation to the driver even when the traction controller is switched off. In particular, there is provision for the flashing information lamp also to flash above the limit speed if there is no longer any possibility of automatic intervention whatsoever when the traction controller is switched off.

In FIG. 5, the way of realizing the procedure according to the invention as a computing program is illustrated by means of a flow diagram using the example of one side of the vehicle, side x. After the part of the program has started at prescribed times, it is tested in the first step 100 whether the switch 44 is closed, i.e. whether the traction controller is switched off or whether the traction system is switched on. If this is not the case, the part of the program is terminated. If this is the case, in step 102 the speed VFZG of the vehicle is compared with a prescribed threshold value $V_0$. If the speed of the vehicle exceeds this threshold value, the part of the program is terminated; in the opposite case measures for producing a locking differential effect by braking intervention are carried out.

The measures consist initially, according to step 104, in the current brake pressures Px and Py being read in at the wheel brakes of the driving wheels of the two sides of the vehicle and the current wheel speeds $V_x$ and $V_y$ of the driving wheels of both sides of the vehicle being read in. In addition, the deviation of the current wheel speed from the prescribed desired value, i.e. the control deviation BRAY, of the other side of the vehicle is read in. This is determined in a corresponding computing program for the side y. Afterwards, in step 106 the control deviation BRAX of the x side is calculated on the basis of the wheel speed $V_x$, the current speed VFZG of the vehicle and the slip threshold lambda. In the following interrogation step 108 it is tested whether the wheel speed $V_x$ is higher than the wheel speed $V_y$. If this is the case, in step 110 the occurrence of a positive control deviation, which indicates a tendency to spin, is interrogated on the y side. If the control deviation BRAY>0, i.e. the driving wheel of the other side of the vehicle shows a tendency to spin, it is to be assumed that both wheels are spinning. The reason for this is that according to step 108 the wheel speed $V_x$ is greater than $V_y$, in which case when there is a tendency to spin on the y side the tendency to spin on the x side follows automatically. According to step 112, the pressure in the wheel brake of the driving wheel on the vehicle side x is reduced or kept at its zero value according to the illustration in FIG. 4 and the information lamp is actuated with a pulse signal and the part of the program is terminated. This applies correspondingly to the y side. If the result of step 110 is that there is no positive control deviation present on the y side, it is tested in step 114 whether the brake pressure in the wheel brake on the y side Py is greater than a prescribed minimum pressure $P_{0y}$, which is preferably zero. If this is the case, there is a control intervention in the decay on the vehicle side y so that according to step 112 the pressure in the wheel brake on the side x is maintained, i.e. no pressure is applied. This corresponds to the situation illustrated in FIG. 3c between the times $t_1$ and $t_3$. According to step 112, the part of the program is terminated. The information lamp is also actuated in a clocked fashion in this case. If the result of the interrogation in step 114 has been that the wheel brake pressure on the other side of the vehicle is below the minimum pressure or equal to the minimum pressure, in step 118 brake pressure is applied to the brake of the driving wheel on the side x as a function of the control deviation calculated in step 106. In the event of a positive control deviation, the information lamp is actuated in a clocked fashion. According to step 118 the part of the program is terminated.

If, according to step, 108 the wheel speed on the side y is higher than or equal to that on the side x, it is tested in step 120 whether a control deviation BRAX>0 is present on the side x, i.e. whether the driving wheel shows a tendency to spin. If this is the case, in a way analogous with the positive response in step 110, it is assumed that both driving wheels are spinning. For this reason, in step 122, the brake pressure in the wheel brake on the side Y is reduced or kept at its zero value (the same applies for the x side). Subsequently, the part of the program is terminated. The information lamp is also actuated in a clocked fashion in this operation state. If after step 120 there is no tendency to spin at the driving wheel on the vehicle side x, in the interrogation step 124 the brake pressure in the associated wheel brake Px is tested to determine whether it is greater than a minimum pressure POx. If this is the case, a control intervention in the vehicle side x is terminated so that according to step 122 the brake pressure is reduced or kept at its zero value. Subsequently, the part of the program is terminated. If, according to step 124, the brake pressure Px is below the minimum pressure POx or is equal to it, according to step 128 the brake pressure on the side x is maintained and applied on the side y as a function of the control deviation read in in step 104. Subsequently the part of the program is terminated.

FIGS. 6a–6d show the situation when the vehicle is cornering. If the speed $V_x$ of drive wheel x exceeds a threshold relative to the reference speed as shown in FIG. 6a, the pressure is built up and reduced as shown in FIG. 6c. Even if the speed of the other drive wheel is below the threshold value, as shown in FIG. 6b, the pressure $P_y$ at the other drive wheel is built up and reduced synchronously with the pressure $P_x$ as shown in FIG. 6d. This improves the stability of the vehicle during cornering.

FIG. 7 shows a modification of FIG. 5 which takes into account the possibility of cornering. Following steps 100 to 106 in FIG. 5, it is determined in step 200 whether the vehicle is cornering. This determination is made on the basis of a signal from a steering angle sensor, or by comparing the speeds of the non-driven wheels. In the latter case cornering is indicated when the difference exceeds a prescribed threshold. If the vehicle is not cornering, the program proceeds to step 108 in FIG. 5.

If the vehicle is cornering, the program proceeds with step 202, which determines whether the brake pressure at at least one of the drive wheels exceeds a predetermined value P1. In a preferred embodiment P1 has the same value as the minimum value P0. Otherwise P1 is greater than P0. If neither $P_x$ nor $P_y$ exceeds P1, the program proceeds to step 108.

If $P_x$ or $P_y$ exceeds P1, the program proceeds with step 204, which compares the speeds of the drive wheels as in step 108. If $V_x$ exceeds $V_y$, the program proceeds with step 208, which controls the pressure of wheel x as a function of the slip value $BRA_x$. The pressure at drive wheel y is built up and reduced synchronously with the pressure at wheel x. If $V_x$ does not exceed $V_y$, the program proceeds with step 210, which controls the pressure of wheel y as a function of the slip value $BRA_y$. The pressure at drive wheel x is built-up and reduced synchronously with the pressure at wheel y.

In another embodiment step 202 is missing or is established in steps 208 and 210. In this case the synchronous raising of pressure at the second wheel is stopped, when the brake pressure at the drive wheels reaches P1. Above P1, the brake pressure at the drive wheels is controlled as a function of the respective slip values $BRA_x$ and $BRA_y$.

The foregoing is exemplary and not intended to limit the scope of the claims which follow.

What is claimed is:

1. Method for controlling drive slippage of drive wheels in a vehicle having an engine, first and second drive wheels, and brakes at said drive wheels, said method comprising determining when the first drive wheel has a slippage which exceeds a threshold drive slippage, building-up brake pressure at said first drive wheel when said first drive wheel exceeds said threshold drive slippage, reducing brake pressure at said first drive wheel, determining when the second drive wheel has a slippage which exceeds said threshold drive slippage, and not building-up brake pressure at the second drive wheel before said brake pressure at said first drive wheel has been reduced to a predetermined minimum pressure.

2. Method as in claim 1 wherein said predetermined minimum pressure is zero.

3. Method as in claim 1 wherein said brake pressure at said first drive wheel is reduced when said first drive wheel falls below said threshold drive slippage.

4. Method as in claim 3 wherein brake pressure at said second drive wheel is built-up when said second drive wheel exceeds said threshold drive slippage and the brake pressure at the first drive wheel has been reduced to said predetermined minimum pressure.

5. Method as in claim 1 wherein said brake pressure at said first drive wheel is reduced when said second drive wheel exceeds a threshold drive slippage.

6. Method as in claim 5 wherein, when both of said drive wheels exceed said threshold drive slippage after said pressure at said first drive wheel is reduced, the brake pressure at both of said drive wheels is maintained at zero.

7. Method as in claim 1 further comprising manually activating a switch which switches off a traction controller of the vehicle.

8. Method as in claim 7 further comprising providing a switch which lights up when the traction controller is switched off and flashes.

9. Method as in claim 1 further comprising, as a precondition to the remaining steps, determining a vehicle speed and determining that said vehicle speed is below a prescribed speed threshold.

10. Method as in claim 9 wherein the brake pressure at a drive wheel is a function of the vehicle speed.

11. Method as in claim 1 wherein the brake pressure of a drive wheel is a function of the slippage at said drive wheel when the slippage of at least one drive wheel exceeds a predetermined slippage.

12. Method as in claim 1 wherein the slippage of the drive wheels is determined as a function of wheel speed, vehicle speed, and a desired slip value.

13. Method as in claim 1 further comprising monitoring temperature of brakes at said drive wheels and limiting torque of said engine when said temperature exceeds a predetermined value.

14. Method as in claim 1 further comprising limiting torque of said engine when brake pressure at a drive wheel exceeds a predetermined limit value.

15. Method as in claim 1 wherein said brake pressure at said second drive wheel is maintained at zero until said brake pressure at said first drive wheel has been reduced to said predetermined minimum pressure.

16. Apparatus for controlling drive slippage of drive wheels in a vehicle having an engine, first and second drive wheels, and brakes at said drive wheels, said method comprising means for determining when the first drive wheel has a slippage which exceeds a threshold drive slippage, means for building-up brake pressure at said first drive wheel when said first drive wheel exceeds said threshold drive slippage, means for reducing brake pressure at said first drive wheel, means for determining when the second drive wheel has a slippage which exceeds said threshold drive slippage, and means for precluding a pressure build-up at the second drive wheel until said brake pressure at said first drive wheel has been reduced to a predetermined minimum pressure.

17. Method for controlling drive slippage of drive wheels in a vehicle having an engine, first and second drive wheels, and brakes at said drive wheels, said method comprising determining when the first drive wheel has a slippage which exceeds a threshold drive slippage, building-up brake pressure at said first drive wheel when said first drive wheel exceeds said threshold drive slippage, determining when the vehicle is cornering, and building-up brake pressure at said second drive wheel synchronously with said building-up at said first drive wheel when said vehicle is cornering.

18. Method as in claim 17 wherein said pressure build-up at said first and second drive wheels is a function of the slippage of the first drive wheel.

19. Method as in claim 17 further comprising, as a precondition to building up brake pressure at said second drive wheel synchronously with said building up at said first drive wheel, determining that the brake pressure at at least one of said drive wheels exceeds a prescribed threshold value.

* * * * *